(12) United States Patent
Kock et al.

(10) Patent No.: US 7,872,436 B2
(45) Date of Patent: Jan. 18, 2011

(54) CONTROL METHOD FOR A ROBOT

(75) Inventors: Sönke Kock, Pfungstadt (DE);
Christian H Müller, Ladenburg (DE);
Torgny Brogårdh, Västerås (SE); Jesper Bergsjö, Västerås (SE); Andreas Olevik, Västerås (SE); Stig Moberg, Västerås (SE)

(73) Assignee: ABB AB, Västerås (SE)

( * ) Notice: Subject to any disclaimer, the term of this patent is extended or adjusted under 35 U.S.C. 154(b) by 984 days.

(21) Appl. No.: 10/557,774

(22) PCT Filed: May 19, 2004

(86) PCT No.: PCT/SE2004/000790

§ 371 (c)(1),
(2), (4) Date: Mar. 9, 2007

(87) PCT Pub. No.: WO2004/104714

PCT Pub. Date: Dec. 2, 2004

(65) Prior Publication Data

US 2007/0260356 A1   Nov. 8, 2007

(30) Foreign Application Priority Data

May 22, 2003   (SE) .................................. 0301531

(51) Int. Cl.
*G05B 19/404* (2006.01)
(52) U.S. Cl. ...................... 318/631; 700/245; 700/250; 901/2; 318/568.22
(58) Field of Classification Search ............ 318/568.11, 318/568.13, 568.14, 568.22, 568.23, 631; 700/245, 250, 254, 261; 901/2, 3, 4
See application file for complete search history.

(56) References Cited

U.S. PATENT DOCUMENTS

| 4,670,641 | A |   | 6/1987 | Porsander et al. |
| 5,499,320 | A | * | 3/1996 | Backes et al. ............... 700/260 |

(Continued)

FOREIGN PATENT DOCUMENTS

EP   0461288 B1   12/1991

(Continued)

OTHER PUBLICATIONS

Smyth et al, "Phase and Amplitude Sinusoidal Dither Adaptive Control System," Oct. 1963, IEEE Transactions on Automatic Control, pp. 311-321.*

(Continued)

*Primary Examiner*—Khoi Tran
*Assistant Examiner*—Spencer Patton
(74) *Attorney, Agent, or Firm*—Venable LLP; Eric J. Franklin

(57) ABSTRACT

An apparatus, a method and a control system for controlling an industrial robot with at least one axis of rotation and/or translation. The robot includes at least one actuator or motor at each of the axes for driving a movement of an arm of the robot and at least one sensor at each of the rotatable shafts. A dither-signal generator for generation of a periodic signal is used to provide a varying dither signal to a servo of the actuator. Automatic adaption of the dither signal is provided. A computer program for carrying out the method and a graphical user interface.

47 Claims, 11 Drawing Sheets

U.S. PATENT DOCUMENTS

| | | | |
|---|---|---|---|
| 5,811,796 A * | 9/1998 | Marchman et al. | 250/234 |
| 5,947,086 A * | 9/1999 | Hoshino et al. | 123/399 |
| 6,094,602 A * | 7/2000 | Schade, III | 700/45 |
| 6,477,445 B1 * | 11/2002 | Ramstrom et al. | 700/245 |

FOREIGN PATENT DOCUMENTS

| | | |
|---|---|---|
| JP | 7234724 A | 9/1995 |
| JP | 07234724 A * | 9/1995 |

OTHER PUBLICATIONS

Hong, Tian et al., "Control of Nonlinear Piezoelectric Stack Using Adaptive Dither," *Proceedings of the American Control Conference*, Seattle Washington, pp. 76-80, Jun. 1995.

* cited by examiner

CONTROL METHOD FOR A ROBOT

CROSS-REFERENCE TO RELATED APPLICATIONS

This application claims priority under 35 USC §119 to Swedish patent application no. 0301531-0 filed on 22 May 2003 and is the national phase application of PCT/SE2004/000790 under 35 U.S.C. §371.

TECHNICAL FIELD

The invention relates to a robot control method and to an industrial robot or other automation machine regulated or controlled by said method. In particular, the method is concerned with controlling robot movement in at least one axis of rotation under an externally imposed force.

BACKGROUND ART

U.S. Pat. No. 4,670,641 entitled: Machine robot, particularly for welding; describes a robot arm for use with an industrial robot. The robot arm has a multiplicity of degrees of freedom. The various parts of the robot arm are rotatable about a plurality of axes. A servo-system for one of the degrees of freedom is capable of disengaging a part of its feedback network, whereby the adjustment passes from Proportional Integral (PI type) control to Proportional (P-type) control. This is done because the accuracy and precision of the robot arm control can surpass the precision of part of the workpiece being welded or otherwise processed. The fine adjustment of the servo controlled movement of the robot arm, and thereby the tool operated, is removed and movement is temporarily regulated in two axes by means of a calculating circuit. The calculating circuit calculates, in this case, two component signals, each being a weighted sum of the difference between the real (measured) values and the or each reference or set point values two of the axis systems.

U.S. Pat. No. 6,477,445 entitled: Method and apparatus for controlling an Industrial Robot; describes a control and regulation system which, amongst other things, has the function of a servo that is also very sensitive to forces imposed externally on the robot arm, tool, gripper and so on. This enables an operator to teach a robot a task by literally taking hold of the robot arm/tool and moving it to specific points as desired. During this time the robot arm and/or tool appear to the operator to be almost weightless. This functionality of a robot is normally only provided when a robot is under what is usually described as a "compliance control" mode of the robot control system. Movements in response to externally imposed forces such as the above are also described as compliant movements. The weight of the robot arm is borne by the various robot arm drive motors under the fine control of the servo control program during such a configuration or teaching stage.

The robot servo control system described above normally performs well in service. However with some robots having gearboxes that have high gear ratios, and for some larger robots with heavier parts, and also under conditions of varying temperature, there is a tendency of increased friction and variation in friction under operation that makes accurate movement in response to externally applied forces difficult. Increased friction is also due in part to the use of pre-stressed bearings and pre-stressed gears which improve structural stiffness of the various components but cause increased loads on the bearings, and thus increased friction. Another problem is that reaction forces can arise sometimes in a second axis in response to movements of a large amplitude in a first axis, which further complicates accurate control of the forces in one or more axes.

SUMMARY OF THE INVENTION

The present invention solves one or more of the above problems. In a first aspect of the invention, an apparatus is provided for controlling an industrial robot with at least one axis of rotation and/or translation axes and comprising at least one motor or actuator at said at least one axis for driving a movement of an arm of the robot, with a means for automatic adaption of an applied dither amplitude. In another first aspect of the invention, an apparatus is provided for controlling a manipulator with at least one axis of rotation and/or translation and comprising at least one motor or actuator in said at least one axis for driving a movement of the manipulator, with means for automatic adaption of an applied dither amplitude.

In a second aspect of the invention, a method is provided for controlling an industrial robot with one or more (typically from 1-6) axes of rotation and/or translation, the method comprising determining the position of said actuator; determining the amplitude of the current dither movement of said actuator; calculating a deviation from a known reference value of the dither movement, and sending the dither movement deviation to an integrating controller and by so doing cause the dither amplitude to be automatically adapted to a current operating state.

In another aspect of the invention a computer program is described for carrying out the method according to the invention. In another aspect of the invention a computer program product comprising a computer program for carrying out the method of the invention is described.

In another, further aspect of the invention a graphical user interface is described for displaying operational and configuration data for a robot controlled according to the invention.

In yet another, further aspect of the invention a control system is described for controlling an industrial robot with at least one axis of rotation and/or translation and preferably a plurality (between 1-6) of axes. In relation to this and other aspects of the invention a database is described for storing and making available data generated, stored in a specific way, and then retrieved during the practice of the invention.

The principal advantage of the invention is that control over the robot while it is operated under compliance control is more exact. The force or forces required from a human operator to move or guide a robot arm in a certain direction is/are reduced in magnitude. The invention reduces the effect of friction, especially in bigger or heavier robots, by means of introducing oscillations (called "dithering" hereafter) in at least one of the motors and transmissions of the robot in a controlled manner, such that the level of oscillations is high enough to overcome static friction and stiction, but limited to avoid exciting vibrations of the robot end effector. The operator can also move the robot arm or tool more quickly between the desired points in space because the reduced effect of frictional forces during compliant control enable a faster, accurate response by the servo motors or actuators. It should be noted that the invention may be embodied as a manipulator arm rather than an industrial robot that that may have a plurality of rotational/translational axes.

Another advantage of the invention is that changeover from normal robot control to compliance control is accomplished in a better regulated manner, making it easier to begin teaching or configuring a robot, and also to switch back to normal operating control.

Another further advantage is that movement of the robot during maintenance service work or changes in production, is simplified and improved thus reducing down time and service time. This is very advantageous when using robots to tend other machines, for example to supply a workpiece to a welding robot for welding or to remove a component after an operation has been carried out by another machine, as set-up times and configuration or re-configuration times can be reduced. In addition, set-up times required during production changeovers to facilitate flexible manufacturing, or to suit changes in the specification of a product manufactured using traditional batch or continuous production may be greatly reduced.

BRIEF DESCRIPTION OF THE DRAWINGS

A more complete understanding of the method and system of the present invention may be had by reference to the following detailed description when taken in conjunction with the accompanying drawings wherein.

DESCRIPTION OF THE PREFERRED EMBODIMENTS

Figure 1:
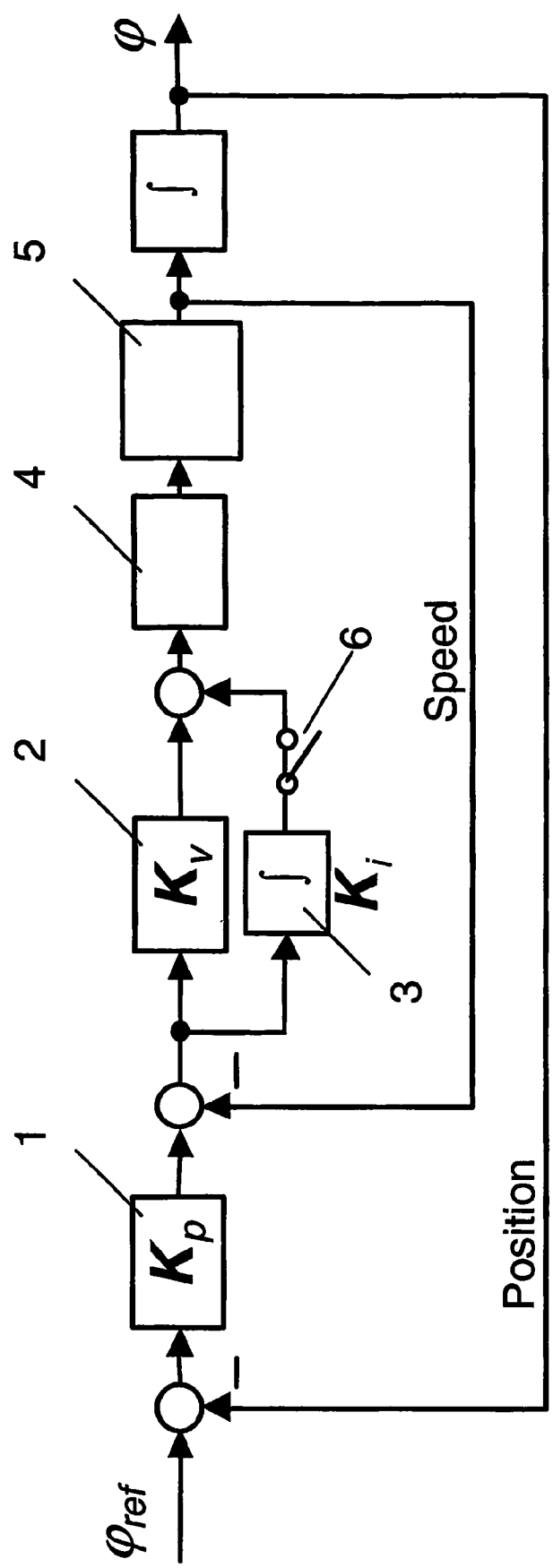
FIG. 1 shows in a schematic diagram a general control loop for a robot axis according to the Prior Art.

FIG. 1 (Prior Art) shows a control loop for controlling one axis of a robot, as it is normally used for control of robots. The control is a cascade control comprising an internal velocity control loop with PI-controllers 2, 3 and an external position control loop (with position measurement on the motor side) with P-controller 1. The parameters of the control are usually selected as high as possible in order to ensure that the robot follows the path generated according to a series of desired positions, as accurately as possible, and also under the influence of external forces. The motor torque control servo 4 providing an input with a torque reference is shown and a motor, gear/gearbox and arm indicated schematically as another block 5.

In the Prior Art control method in order to attain the desired compliance of the robot, in 1, 2 the integral component of the PI-controllers of the velocity control loop 3 is disconnected at switch 6 when changing from normal to compliance control and again connected when changing back to normal PI control. In this way, the integrator can be connected and disconnected and still have the correct value for position despite the control model changeover. The actual compliance may be adapted to the requirements by changing $K_p$ at 1 and $K_v$ at 2. Furthermore, the controller output to the servo 4 may be further limited in order to avoid reaction forces which are too great. Reaction forces can sometimes arise in a second axis in response to dither movements in a first axis.

The disconnection of the integral component creates a risk that the robot arm, due to the weight of the arm and the load, which are normally compensated by the integrator, could fall down. To prevent this, in 2 either: the value of the integrator at the time of the change-over is stored and then added to the servo signal; or, a direct compensation is carried out by calculating the gravity torque of force generated by the arm and tool/load. The Prior Art measures described above for achieving the compliance are only effective when the motor 5 and the gear of the robot arm are not accompanied by a friction component that is too great. Since compliance control of the Prior Art is a passive system, the external force not only has to overcome the compliance force of the robot set via the position loop gain $K_p$ 1 and velocity $K_v$ at 2 but it also has to overcome any friction in the motor and the gear gearbox. If the friction is small vis-à-vis the compliance, its influence may be neglected. However, if the friction becomes significantly higher a defined compliance can no longer be set in the robot using the Prior Art method described above.

Figure 2:
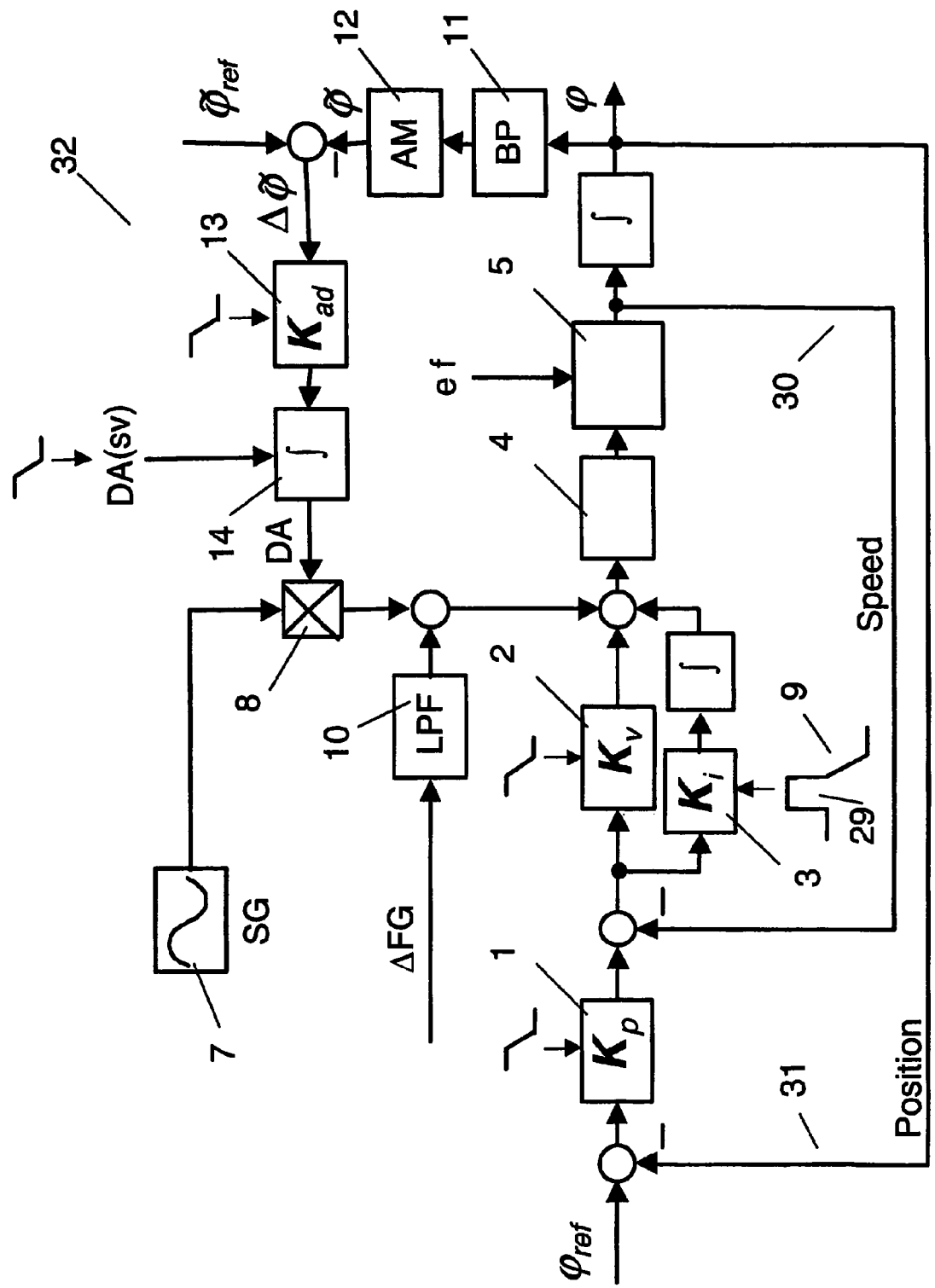
FIG. 2 shows schematically a control loop with additional, automatic adaptation of the amplitude of an applied dither signal according to a preferred embodiment of the invention.

FIG. 2 shows a preferred embodiment according to the invention with additional and automatic feedback dither loop 32 adaptation of the dither amplitude. A general speed control loop 30 is shown that also comprises a proportional gain $K_v$, control 2, and an integral gain control $K_i$. In addition, a dither signal generator 7 and a signal multiplier 8 are connected to provide a dither signal of an appropriate dither amplitude as a feed forward signal to servo 4. The additional dither loop 32 comprises a band pass filter 11, an amplitude calculation algorithm 12, with an integrator 14 and gain control $K_{ad}$ 13. The dither amplitude DA of the output from multiplier 8 is achieved as the output value of integrator 14 input to multiplier 8 multiplied by the output of the dither signal generator 7.

The start value or initial value of the integrator 14 may be supplied from any memory means, including a database such as database 94 (see FIG. 9 below) or as a start value 16 in a state memory from another memory storage means (see FIG. 5 below). In the preferred embodiment, the invention ensures that the dither amplitude DA is adapted automatically to the current operating situation of the robot when subject to varying frictional conditions through, for example, influence of changes in ambient temperature, changes in gearbox temperature, load changes, positional changes and so on. It is of decisive importance for accurate compensation for friction forces that, to the greatest possible extent and independently of the operational state, the dither movement is a uniform dither movement within the intended axis-specific amplitude. If the dither amplitude is too small, the effect of friction compensation is not sufficient. If dither amplitude is too high, the dither signal will result in undesired oscillations of the robot end effector.

To automatically adapt the dither amplitude to the current operational state, the dither movement is preferably obtained from the measured motor position by means for example of an appropriate band pass filter 11. However, it should be noted that it is a matter of convenience to use a measurement of the motor position, as that value could equally be calculated from a measurement of the motor speed if desired. The motor speed could also be used as an input into 11. From the resultant signal, the amplitude $\hat{\phi}$ of the present dither movement is determined with the aid of an appropriate algorithm 12. An algorithm that determines amplitude is to be preferred as the measurement may then be obtained within one or a few cycles of the dither period.

The deviation $\Delta \hat{\phi}$ from the required amplitude of the dither movement $\tilde{\phi}_{ref}$, which is obtained for one specific axis, is then supplied to an integrating controller 13, 14, preferably an I, PI or PID controller, which performs the corresponding changes to and adaptations of the dither amplitude. The functions such as those of an integrating controller may be implemented in different ways. Analogue components could be used. The integrators could be included in the same component, as the servo 4, or into a component that the speed control 30 and/or the position control 31. If the servo for example is digital, then it would be advantageous to have the dither loop 32 implemented as a digital dither loop. A digital implementation may be carried out using a single processor, an application specific processor or a computer with a more general instruction set.

The control model described here is not limited to a cascade arrangement, as indicated in the figures. That is to say that if the speed loop and the position loop are configured in parallel as for example, for a state controller, the same type of dither loop control loop as 32 can be used to practise the invention.

The adaptation of the dither amplitude is required for both the dither movement during the compliance control and for another control phase or model called the pre-dither control (see FIG. 8 below for a description of pre-dither). Different values for the control feedback gain $K_{ad}$ at 13 are required depending on whether it is for pre-dither control or dither amplitude, $K_{ad}$ during compliance control. Similarly, the start value of the integrator 14 is likely to be different depending on whether the arm is under pre-dither or compliance control, and the start value will therefore be changed over a ramp from the pre-dither to the dither value, in the same way as the controller parameters change when shifting from normal to compliance control. To this end, initial values of the pre-dither and dither amplitudes should be stored for use by the integrator, e.g. in as state memory 16 in a memory storage means or in database 94. By means of the described feedback, an automatic adaptation of the dither amplitude under varying operating conditions is thus obtained and, in particular, without any intervention by the operator being necessary.

Figure 3:
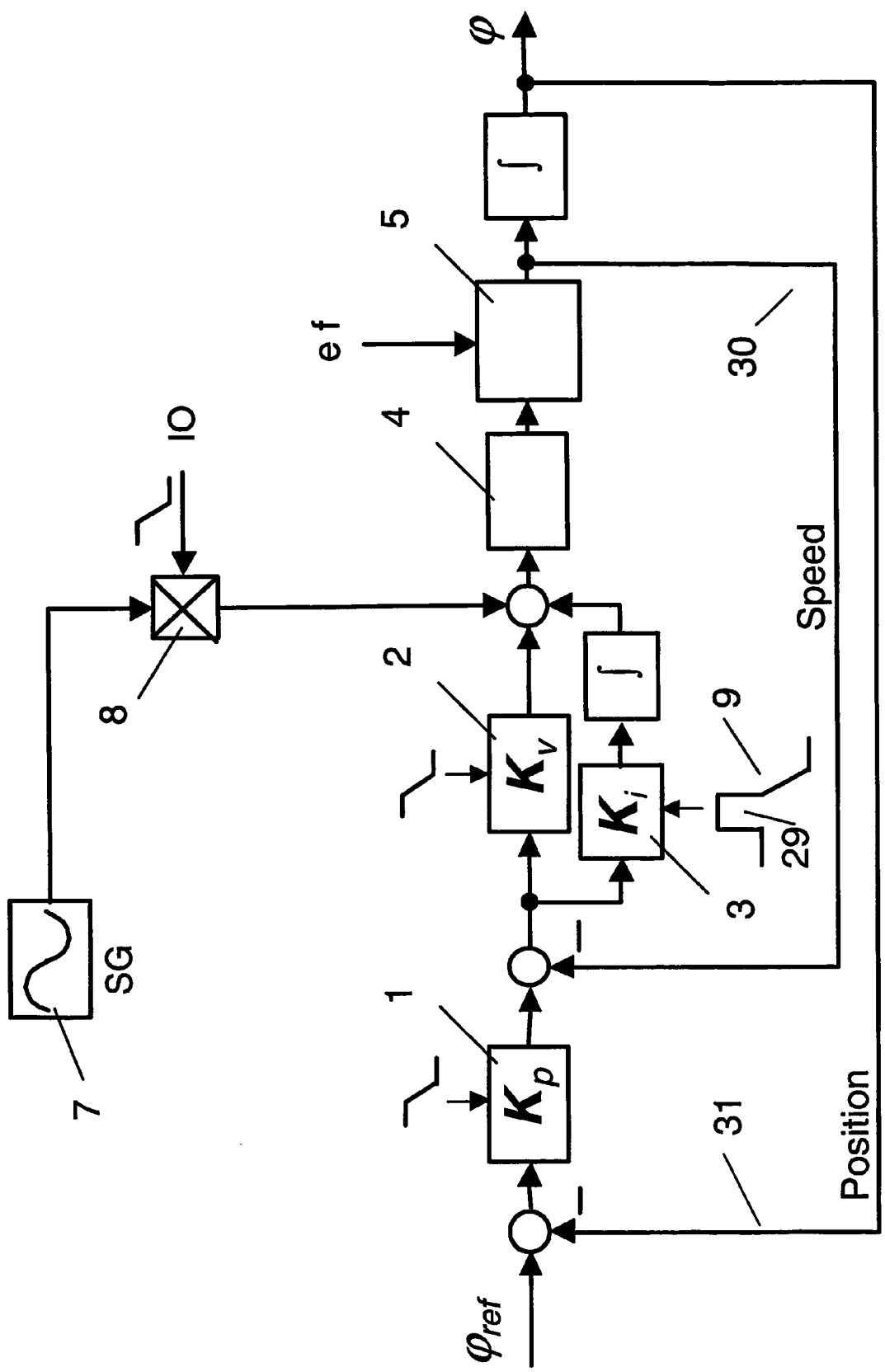
FIG. 3 shows in a schematic diagram a control loop with a dither signal applied to it according to an embodiment of the invention.

FIG. 3 shows a general control loop for a robot axis according to an embodiment of the invention which includes a device for generating a dither signal for compensation of friction in the robot arm drive mechanism and/or gearbox. The device comprises a sinusoidal generator 7 that generates a periodic, zero-crossing signal, such as for example a sinusoidal, saw-tooth or square wave signal, with a frequency that is chosen and may be axis-specific. The effect of the periodic signal is to make the motor or other type of actuator move through a number of small "extra" movements and thus avoid standstill conditions and the occurrence of static friction.

The majority of moving parts are, of course, journalled in some way with ball, roller or needle bearings or equivalent. However, at relatively low speeds and/or relatively high mechanical loads, static friction can occur, or begin to occur. The parts and joints journalled with bearings have a relatively low friction, although pre-stressed bearings in larger, heavier robots generate a greater friction force. However in the gears and gearboxes sliding friction occurs between meshed gear teeth for part of the time of engagement, and the frictional forces produced by the sliding friction, increased by both high ratio gearing and pre-stressed gear teeth, can, at conditions approaching standstill, cause a force threshold that has to be overcome of 100 Nm or more before a robot arm begins to move.

The inventors have developed a new way to control the amplitude of a dither signal to suit a current operating state of the robot. To produce and control a dither signal an extra torque signal is added to the existing torque signal to the servo so that the moving robot component has a fluctuating acceleration and deceleration in its velocity, countering the onset of static friction. By managing the amplitude of this periodical signal a continually varying change in velocity, of a controlled amount, is imposed so preventing the occurrence of static friction. The amplitude of the sinusoidal signal is determined and fixed by the value of the dither amplitude (DA) with the aid of the multiplier 8. The dither amplitude is also determined and fixed at a value which is specific to a or each axis.

The term axis-specific is used here to mean that the axis-specific value is suitable for one specific axis and may be different from the same value applied in other of the robot or robot arms axes of movement, which are commonly up to six axes. The axis-specific values are also selected to minimise force at frequencies that would excite the respective joint, causing additional problems such as vibration and/or wear. It should also be underlined that the sinusoidal generator 7 is normally only connected during the compliance control (when PI control is switched out) and is then disconnected again for normal PI control. Also shown is a ramp function 9 beside $K_i$ integrator 3 depicting the gradual ramp-over from PI control to P control. According to the invention, the compensation for the robot or robot arm gravity torque on the axis during the compliance control is achieved in such a way that the integrator is not completely switched off but that only the transfer value of the integrator $K_i$ at 3 multiplied by $K_p$ is set to zero. The integral value of the integrator then contains approximately the value of the weight that has to be compensated for. Further, to obtain a continuous and smooth transition between normal and compliance control and vice versa, according to the invention as mentioned above the control parameters $K_p$ at 1, $K_v$ at 2 and $K_i$ at 3 are not shifted or switched off but changed by way of a ramp function (as indicated in FIG. 3 by the course of the ramp 9). The length of the ramp may be varied depending on the process.

When shifting from normal to compliance control, the integral component of the controller is expected to contain the torque due to gravity. In reality, it differs from the expected value by the amount of friction associated with the respective axis. Whether the real value is above or below the expected value depends on the direction of the last movement of the respective axis before it stopped. The amount of friction depends on the physical parameters of the gearbox and bearings, temperature and wear, but also on the static torques and forces on the gearbox and bearings associated with the robot position and gravity and can therefore be considered unknown. Because the value stored in the integral part will not exactly match the real gravity, it will lead to undesired drift of the respective robot axis after the dither movement has been switched on. The reason for this is that when the dither starts, then the controller does not need to compensate for the friction any longer and the frozen integrator value will not be correct, since it also contains the friction torque as well as the gravity torque. To prevent this, the invention according to another embodiment provides for the use of an additional dither-type movement, designated pre-dither, before shifting the controller parameters. That is to say, before switching off PI control fully.

In a similar way as in the case of the compliance control, the dither movement compensates for the friction and, during the pre-dither stage, brings about an adaptation of the integral value dependent on gravity only, i.e. after the pre-dither adaptation when the robot is set to compliant mode, the integral value contains very accurate gravity information without the error caused by friction as mentioned above. In addition, to accelerate this process, the gain of the integrator 3 can be briefly increased during the pre-dither as indicated by the vertical rise, horizontal line, then vertical fall 29 prior to the straight line part of ramp 9 of FIG. 3. Since the control loop during the pre-dither has a different and normally higher gain and therefore greater resistance to disturbances than during the compliance control, the dither amplitude generated at multiplier 8 must be controlled to be correspondingly higher during the pre-dither period than during the compliance control. This is achieved by a higher integrator start value into integrator 14 and a higher gain $K_{ad}$ as seen in FIG. 2. The gain is then changed, by means of the control parameters, over a ramp transition indicated as 29 from the pre-dither value to the dither value.

Figure 4:
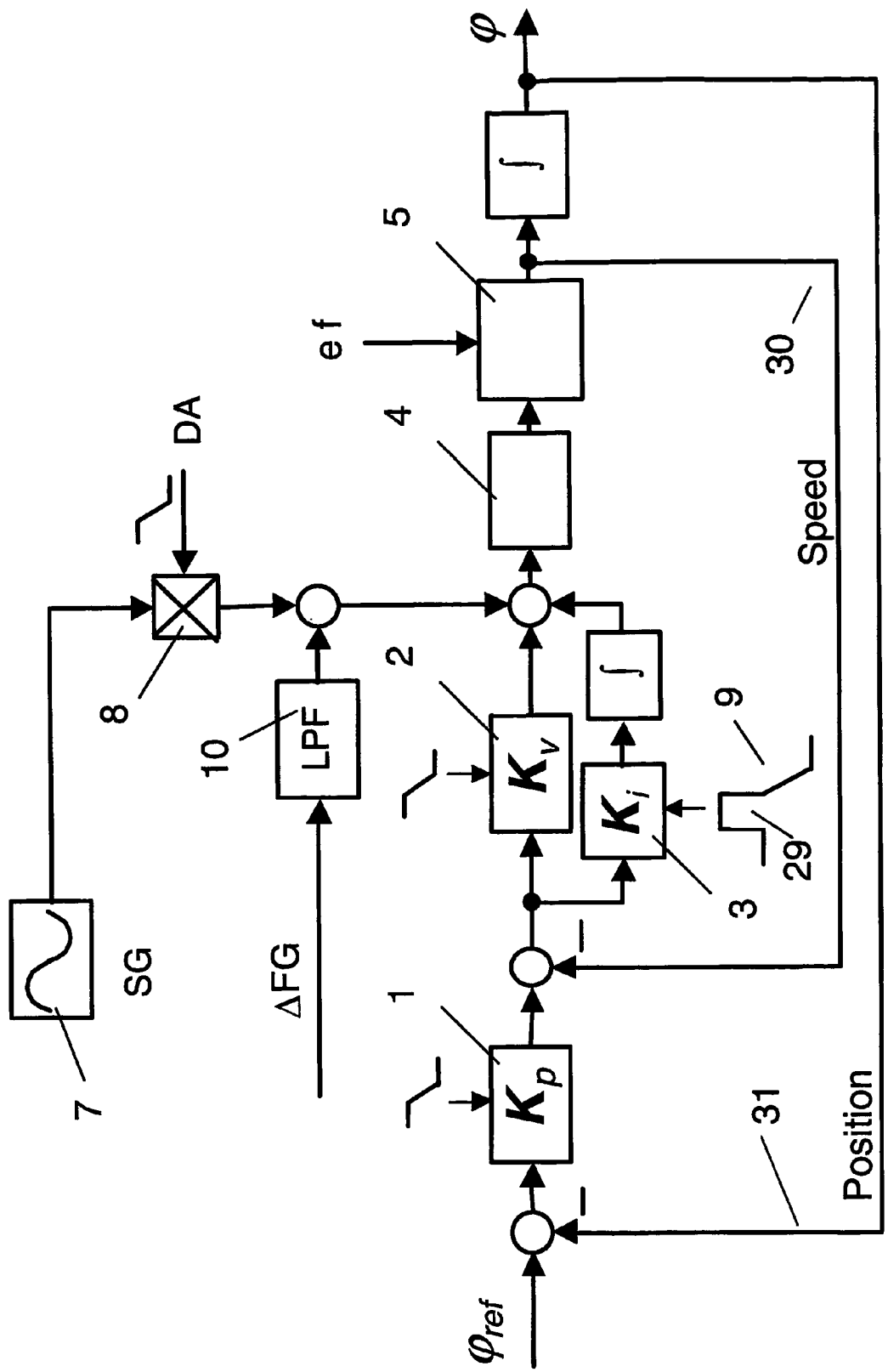
FIG. 4 shows schematically a control loop with an additional adjustment for a change in weight according to another embodiment of the invention.

FIG. 4 shows the control loop of FIG. 3 with the addition of a low-pass filter 10 to the loop after the dither amplitude (DA) multiplier 8. The low-pass filter 10 supplies a weight change value, $\Delta F_g$. In case of larger movements of the robot or in case of changes of the load during the compliance control, undesired movement of the robot may arise. This is because the change of the gravity torque cannot be equalized since the integrator is switched off. In these cases, the invention in a further embodiment provides for the extension of the control loop shown in FIG. 3, by a feed-forward control of the gravity torque change. In this context, only the changes of the weight during the compliance control are adjusted by the feed-forward loop, since the initial weight, as described above in relation to dither, is stored in the integrator. The change of the weight is determined based on the model (see below) and is applied by way of the low-pass filter 10 to suppress any transient disturbance of the control loop. At the end of the compliance control, the feed-forward adjustment value for the weight is then smoothly taken over by the integrator during the ramp transition 9 when shifting to normal control. In this way, the movement of the robot during compliance control is made independent of changes of the weight borne by the robot during operation. The model of the robot referred to above is a general, widely used model of the robot as a rigid, multi-body model of a robot with known angles of each joint, and where a torque due to gravity can be obtained calculated for each joint. Since the calculation of total gravity torque is usually difficult to calculate with sufficient accuracy, only changes of the gravity torque from the level given at the beginning of compliance control is used.

The adaptations of the dither amplitude to different operating conditions described above is, in principle, a learning process that, depending on the initial or start value selected for the dither amplitude, takes a certain amount of time. Since robots in most cases are employed for cyclic operating sequences, the integrator output value, which is adapted in a cycle during the compliance control, is according to the invention stored as a new start value for the integrator 14 in the following cycle. In this way, the first learning phase is omitted or made shorter in the next cycle, whereby a good compensation for the friction is ensured directly from the beginning and an adaptation must take place only in respect of the current conditions (e.g. due to temperature change) that have changed since the previous cycle or are changing subsequently during a following operation.

Figure 5:
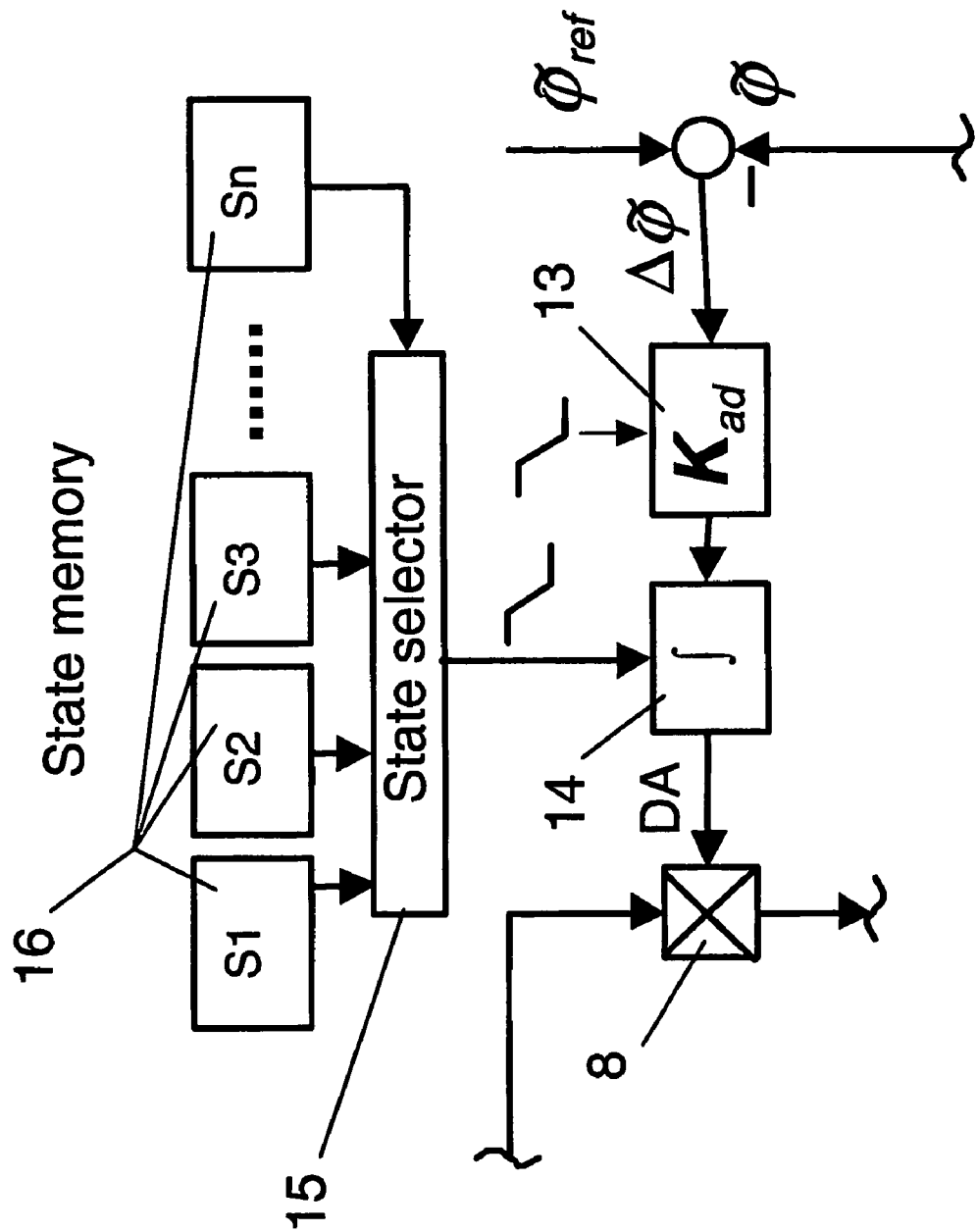
FIG. 5 shows schematically a selection of learnt dither amplitude values retrievable from a state memory as initial values according to another embodiment of the invention.

FIG. 5 shows schematically a state memory, containing a plurality of integrator start values 16 stored as states S1, S2 S3 etc. and a state selector 15. If a robot cycle is planned to have several phases with compliance control in different operational states, then, for each of these phases, according to FIG. 5, the learnt values of the pre-dither and dither integrator output values 16 will be stored S1, S2, S3 etc. in a state memory. Thus if the robot is to make say, five moves in a particular cycle, then the learnt values for each of those five start positions may be saved in the state memory at the end each stage of every cycle to be reused at the beginning of each respective stage in the next cycle. An operational state is then preferably determined by the current robot arm/tool load, the robot position and the selected compliance. A state selector 15 selects the appropriate initial conditions in accordance with the current operational state. The number of stored states may be determined freely according to the requirements.

Furthermore, another, further preferred embodiment of the invention relates to a method for minimizing the forces between the robot and the tool/load under specific circumstances, in situations where part or all of the weight of the tool and/or load is taken up in some way by the surroundings. This is necessary, for example during framing operations, when no bracing (or staying or guying) forces are allowed to appear at the robot flange when the tool is released by the robot, or when no forces are allowed to appear between the tool (e.g. a gripper) and the load when the load is released by the robot. The corresponding extensions of the control loop are shown in FIG. 6.

Figure 6:
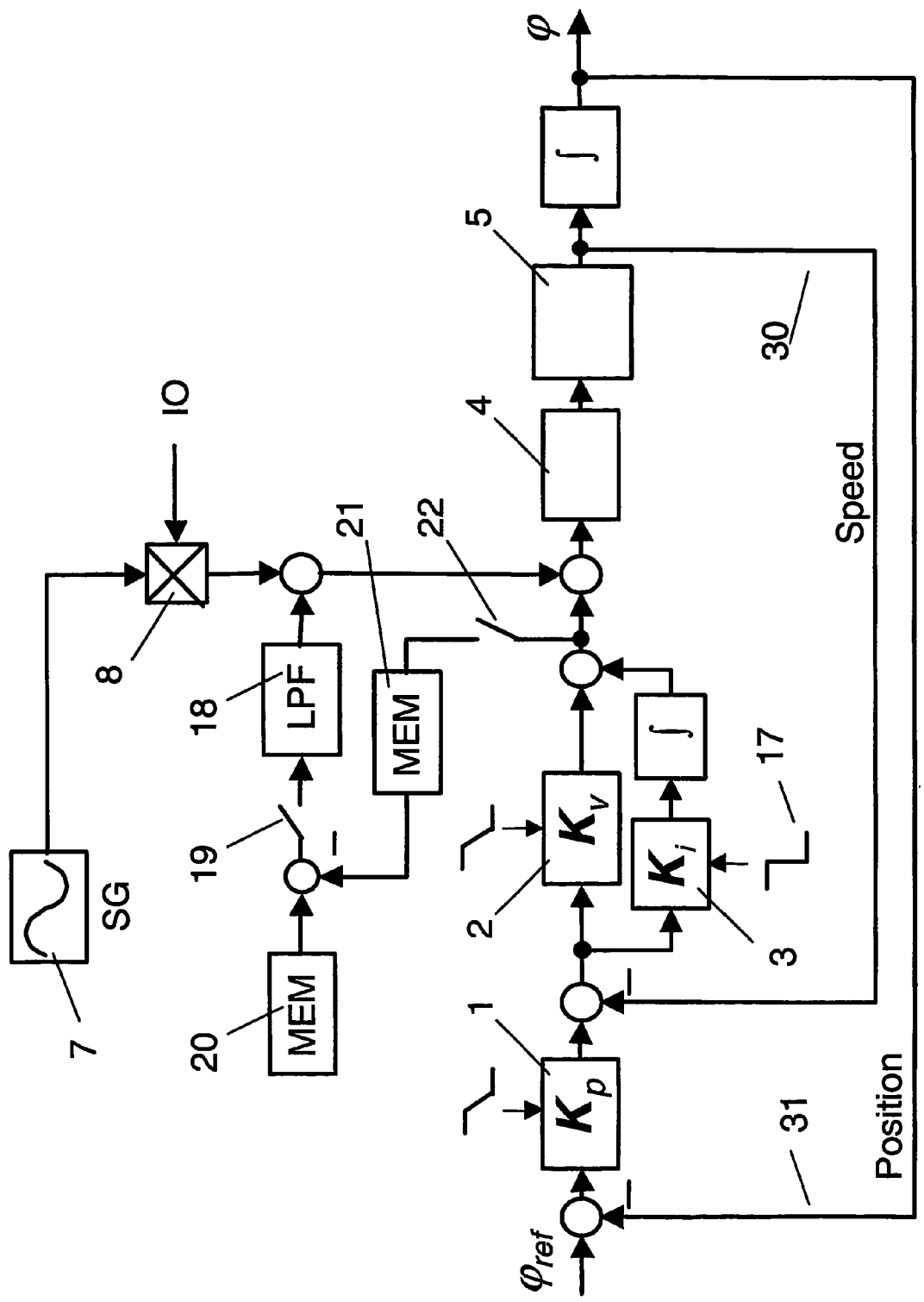
FIG. 6 shows an extension of a scheme for control for reduction of forces between a robot and a tool or load during compliance control according to another embodiment of the invention.

FIG. 6 shows a control loop similar to that shown in FIG. 2, further extended by memory storage means 20 and 21, switch means 19 and switch means 22 and a low pass filter (LPF) 18. The method for reducing the forces between the robot and the tool and/or load is as follows.

First of all, the robot is run without the tool to the position in which, later on, the connecting forces are to be minimized. Alternatively, if the forces between a tool and a load are to be minimized, the robot is run with the tool, but without the load to said position. In this position, the input value of the servo 4, which is necessary to hold only the robot (or the robot with tool, alternatively) at this position, is recorded and then stored in the first memory 20 which may be comprised as memory storage means anywhere in the robot control system. To compensate for the influence of any friction, the robot may also, for this purpose, first be shifted to the compliance control with dithering and with great compliance (see also FIG. 10 and step 1008 below). The output of the integrator 14 in the dither loop is also recorded to be used as a start value for the integrator. During the actual operation with a tool and load, in order to minimize the connecting forces, the current input value of the servo is then entered into the second memory 21, primarily with the aid of the switch 22. The difference between this value and the previously stored value of the robot without tool (or with tool and without load, alternatively) at memory 20 is then applied to the servo with the aid of the switch 19 by way of the low-pass filter 18, whereby the low-pass filter 18, serves to prevent irregular transitions. The servo now has precisely the input value that is required to hold only the robot without tool (or with tool and without load, alternatively) in this position. Theoretically, there should be no more connecting forces now. To equalize inaccuracies in the positioning and any possible influence due to friction etc., and thus possible residual forces, a change-over to compliance control with great compliance can now additionally be made, in order to achieve an equalization of the residual forces by way of the dither movement. This means, however, that, contrary to normal compliance control, the pre-dither is omitted and $K_i$ at 3 is set to zero without a ramp, as indicated 17 in FIG. 6, since no adaptation of the integrator to the gravity torque is required. The integrator start value has already been stored in the previous operation of the robot without load, the learning phase for this method of minimising connecting forces.

Finally, after an appropriate number of dither movements, the dither amplitude is reduced by decreasing $K_{ad}$ to zero and simultaneously decreasing the dither amplitude DA to zero in order to avoid forces possibly arising due to the dither movement. At this point there are no more connecting forces between the robot and the tool/load.

All the above methods have been described for the control of a single robot axis. Normally, a plurality of axes are required for the movement of a robot. The control of a plurality of these axes is performed in the same way with an arbitrary number of axes of the robot. In this way, the methods are applicable simultaneously to single axes only or to a plurality of axes.

Actuators or motors of any type, driven by hydraulic power, compressed air, or electric motors, induction motors, combustion engines etc may be used to drive a robot arm and/or different parts of the robot arm. The control signal may be embodied for example as a change in pressure for hydraulic actuators, change in air pressure for pneumatic actuators, change in current or voltage or effect for electric motors and so on. In the best use of the invention, one or more synchronous AC motors are used to actuate the robot arm and/or tools, and a torque reference value is used as the control signal to bring about changes in current supplied to the motor(s). The dither signal in this case creates a continually varying, periodic variation in the speed of the rotating motor and/or gear part. The dithering ramp value is the same as the integrator start value and the dithering amplitude control reference is the same as the integrator output.

Figure 7:
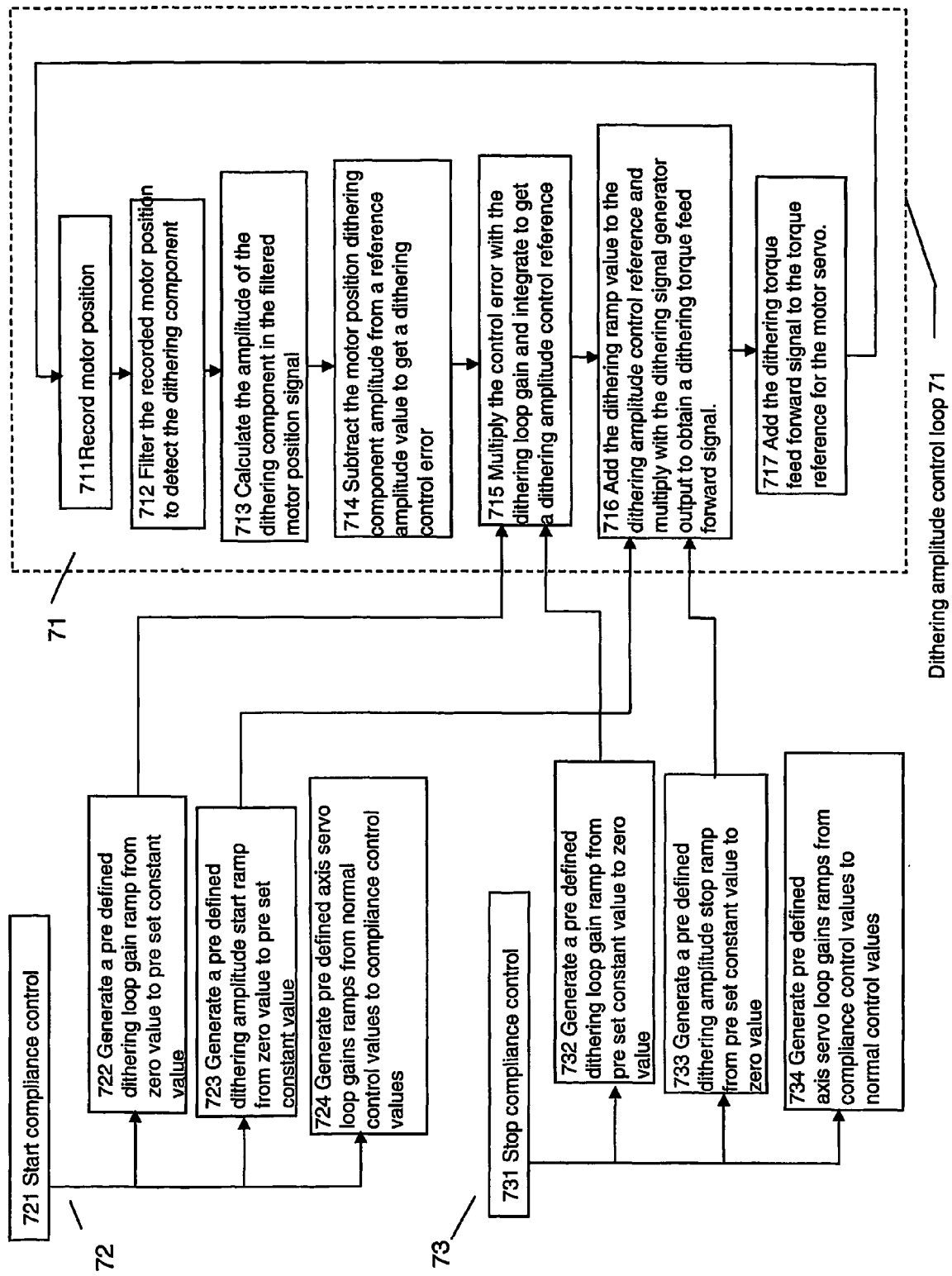
FIG. 7 shows a flowchart for a computer program to carry out a method for automatic adaptation of the amplitude of an applied dither signal the preferred embodiment of the invention.

FIG. 7 shows a flowchart or block diagram describing the steps that a computer program shall execute in order to make a computer or processor carry out one or more methods according to the preferred embodiment of the invention, as described with reference to FIG. 2. In particular, it includes in 71 the steps that execute to provide the dither loop 32 of FIG. 2. The steps are comprised as parts of a:
dithering amplitude control loop 71,
start compliance control routine or sub-routine 72, and
stop compliance control routine or sub-routine 73.

The dithering amplitude control loop 71 of FIG. 7 runs in a more or less continuous fashion as indicated in the diagram, with a given sampling time, which is to say:

711 record motor position,

712 filter motor position signal to get dither component,

713 calculate dither amplitude from filtered motor position signal,

714 subtract dither amplitude from reference value to get dither amplitude error,

715 receive dither loop gain ramp from 722 or 732 and multiply by dither amplitude error from 714 and integrate to get dither amplitude control reference,

716 receive dither ramp value zero to constant from 723 or 733 and add it to dither amplitude control reference and multiply by dither signal generator output to get dither torque feed-forward signal,

717 add the dither torque feed-forward signal to the torque reference for the motor servo

711 record motor position . . .

Note that the start compliance control sub routine 72 may provide an input from a start sequence to the dithering amplitude control loop 71 at steps 715 and 716. The start sub routine comprises:

721 begin start compliance control,

722 generate a pre-defined dither loop gain ramp from zero to a pre-set constant value, if constant value is reached, maintain constant value until compliance control is deactivated, send to 715 of 71,

723 generate a pre-defined dither amplitude start ramp from zero to a pre-set constant value, if constant value is reached, maintain constant value until compliance control is deactivated, send to 716 of 71,

724 generate pre-defined axis servo loop gain ramps from normal control values to compliance control values, if constant value is reached, maintain constant value until compliance control is deactivated.

Note that the stop compliance control sub routine 73 may provide inputs from a stop sequence to the dithering amplitude control loop 71 at steps 715 and 716. The stop sub routine comprises:

731 begin Stop compliance control,

732 generate a pre-defined dither loop gain ramp from pre-set constant value to zero, and send to 715 of 71,

733 generate a pre-defined dither amplitude stop ramp from a pre-set constant value to zero, send to 716 of 71,

734 generate pre-defined axis servo loop gain ramps from compliance control values to normal control values.

Figure 8:
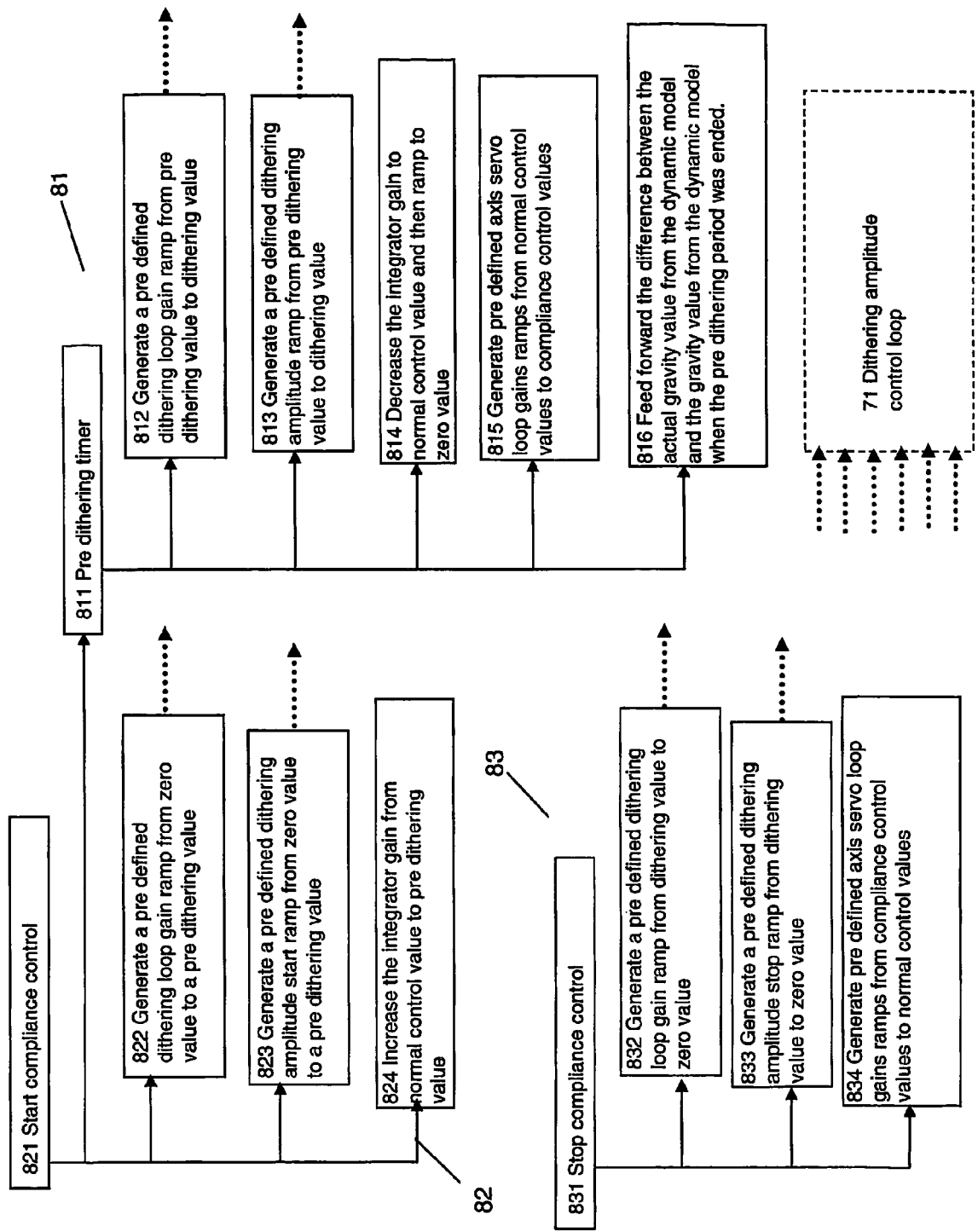
FIG. 8 shows a flowchart for a computer program to carry out a method for providing a compliant control phase comprising periods of pre-dither.

FIG. 8 shows a flowchart for a computer program to carry out one or more methods for providing a pre-dither control phase, as described above in relation to FIG. 3. The steps comprise routines for start compliance control 82, stop compliance control 83, pre-dithering 81 and the dithering amplitude control loop 71 of FIG. 7. The Stop compliance routine is similar to that of FIG. 7.

The method of generating a pre-dither may be carried out by the steps of:

811 start pre dither timer,

812 generate a pre-defined dither loop gain ramp from pre-dither value to dither value, send to 715 of 71,

813 generate a pre-defined dither amplitude ramp from pre-dither value to dither value, send to 716 of 71,

814 decrease the integrator gain to normal control value and then ramp to zero,

815 generate pre-defined axis servo loop gain ramps from normal control values to compliance control values,

816 feed forward the difference between the actual gravity model and the gravity value from the dynamic model when the pre-dither period ends.

Pre-dither start compliance control comprises:

821 signal pre dither timer to start,

822 generate a pre-defined dither loop gain ramp from zero to a pre-set constant value, send to 715 of 71,

823 generate a pre-defined dither amplitude start ramp from zero to a pre-dither value, send to 716 of 71, 824 Increase the integrator gain from normal control value to pre-dither value.

Pre-dither stop compliance control comprises:

831 begin Stop compliance control, 832 generate a pre-defined dither loop gain ramp from dither value to zero, and send to 715 of 71, 833 generate a pre-defined dither amplitude stop ramp from a dither value to zero, send to 716 of 71, 834 generate pre-defined axis servo loop gain ramps from compliance control to normal control values.

Figure 9:
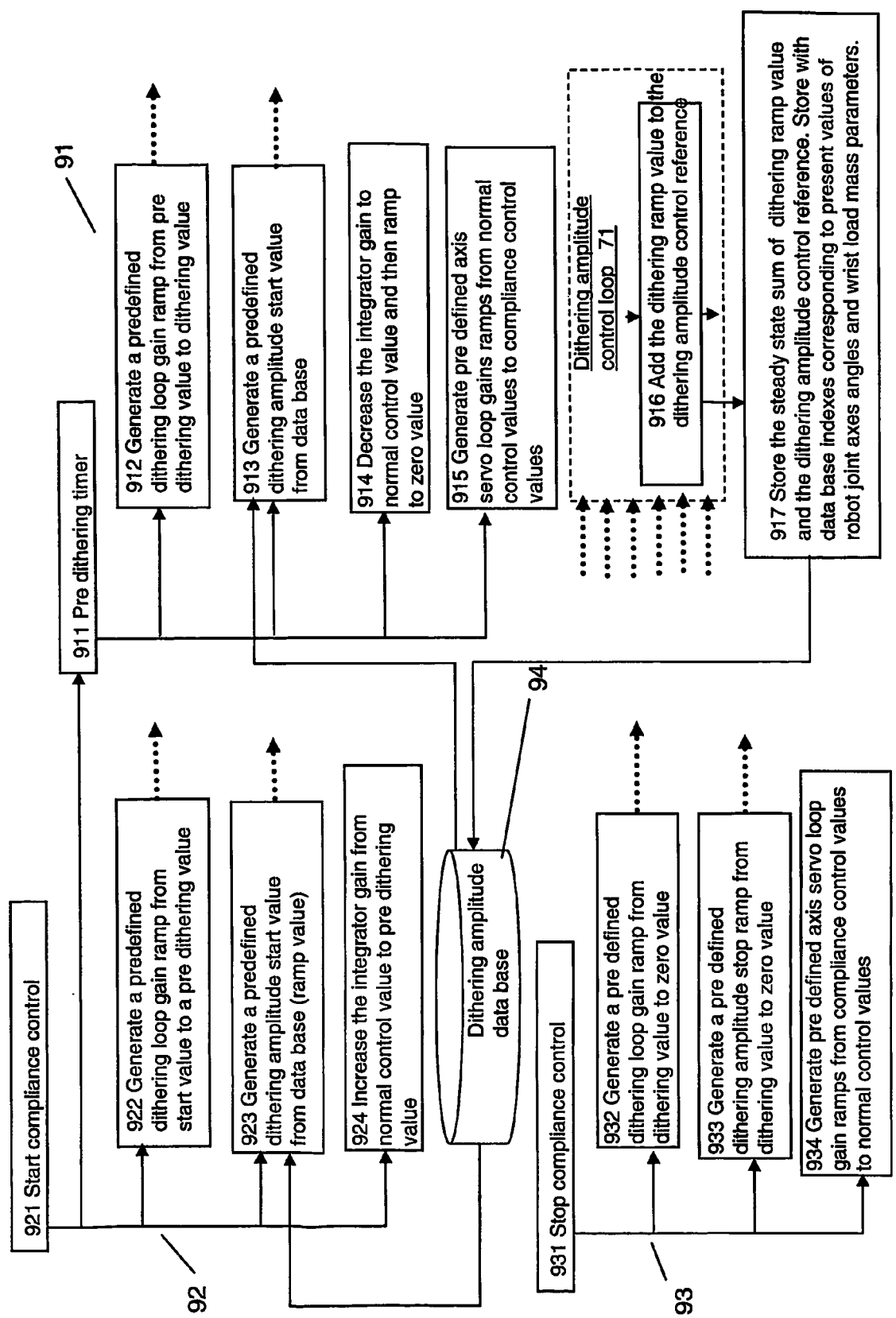
FIG. 9 shows a flowchart for a computer program to carry out a method for providing a compliant control phase comprising saving amplitude values in a state memory and retrieving saved amplitude values from the state memory.

FIG. 9 shows a flowchart for a computer program to carry out a method for providing a compliant control phase comprising saving dither amplitude values from certain points in an operating cycle in a state memory. The saved values are then retrieved from the state memory for the same point during a subsequent operating cycle to provide a start value that ought to be very close to the value currently required. This has been described above with reference to FIG. 5. FIG. 9 shows loops or routines for start compliance control 92, as in FIG. 8, pre-dither control 91 as in FIG. 8, stop compliance control 93 as in FIG. 8, and a version of the dithering amplitude control loop of FIG. 7 here amended to store certain values, for example dither ramp values and dither amplitude control reference values in step 916.

The steps otherwise comprise:

911 start pre dither timer, 912 generate a pre-defined dither loop gain ramp from pre-dither value to dither value, send to 715 of 71, 913 generate a pre-defined dither amplitude ramp start value from database, send to 716 of 71, 914 decrease the integrator gain to normal control value and then ramp to zero, 915 generate pre-defined axis servo loop gain ramps from normal control values to compliance control values, Pre-dither is followed by compliance control as in FIG. 7, with the addition of:

916 Add the dither ramp values to the dither amplitude control reference,

917 Store the steady state sum of the dither ramp value and the dither amplitude control reference; store with database indexes corresponding to present values of robot joint axes angles, wrist load mass parameters and compliance value of compliance control loop.

These values are stored in a database 94 as schematically indicated in FIG. 9. As summarised in step 917, the dither ramp values and dither amplitude control reference are stored associated with their current robot joint axis angle and wrist load mass parameters in such a way, by for example indexing, that values for dither ramp and/or dither amplitude control reference may be retrieved to match a particular robot joint axis angle, wrist load mass parameters and compliance value of compliance control loop. The association between operational values and axis angle and/or wrist parameters may be achieved using any suitable technique, including relational database techniques or pointers, flat file databases, data tables, look-up tables and/or object-oriented association techniques.

Figure 10:
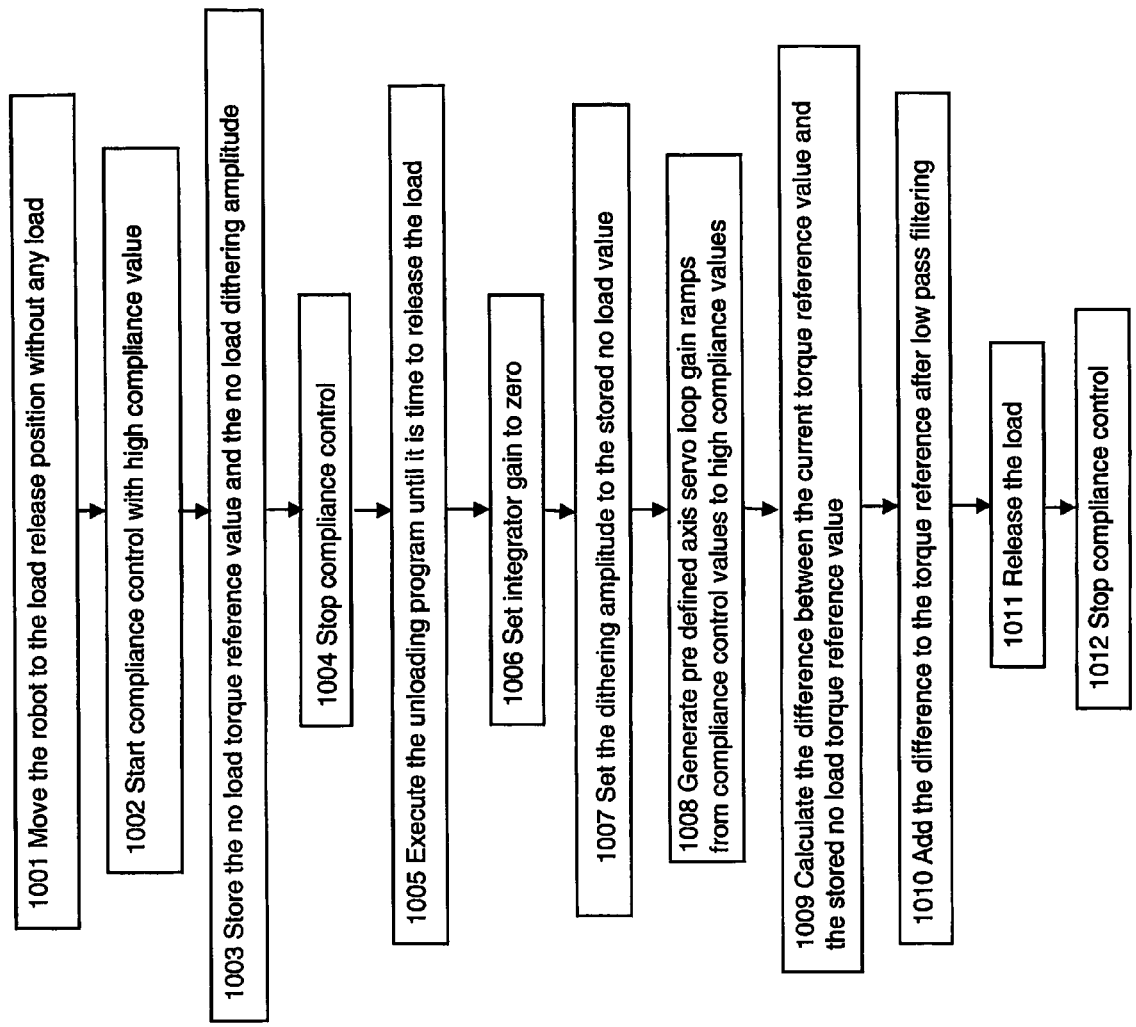
FIG. 10 shows a flowchart for a computer program to carry out a method for providing a compliant control phase comprising steps for minimising any forces between a robot or the robot tool/load and the surroundings.

FIG. 10 shows a flowchart for a computer program to carry out a method for providing a compliant control phase comprising steps for minimising any forces between a robot or the robot tool/load and the surroundings. This method has been described above with reference to FIG. 6. The flowchart comprises the steps of:

1001 move robot to load release position without load, 1002 start compliance control with high compliance, 1003 store no-load torque reference value and no-load dither amplitude, 1004 stop compliance control, 1005 execute the unloading program until it is time to release the load, 1006 set integrator gain to zero, 1007 set dither amplitude to the stored no-load value, 1008 generate predefined axis servo loop gain ramps from compliance control values to high compliance values, 1009 calculate the difference between current torque reference values and store no-load torque reference value, 1010 add the difference to the torque reference after low pass filtering, 1011 release the load, 1012 stop compliance control.

The microprocessor (or processors) comprises a central processing unit CPU performing the steps of the method according to one or more aspects of the invention. This is performed with the aid of one or more computer programs, which are stored at least in part in memory accessible by the one or more processors. The or each processor may be in a central control system for the robot or in a local or distributed computerised control system. It is to be understood that the computer programs may also be run on one or more general purpose industrial microprocessors or computers instead of one or more specially adapted computer's or processors.

The computer program comprises computer program code elements or software code portions that make the computer perform the method using equations, algorithms, data, stored values and calculations previously described. A part of the program may be stored in a processor as above, but also in a ROM, RAM, PROM or EPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory stick™ and other removable flash memories, hard drives etc. may also be used.

The computer programs described may also be arranged in part as a distributed application capable of running on several different computers or computer systems at more or less the same time.

Methods of the invention may also be practised by means of a Graphical User Interface (GUI), a graphical or textual display on an operator workstation, running on a user's logged-in computer, connected direct to the robot control system or connected via a main or local control server or other control system computer.

Figure 11:
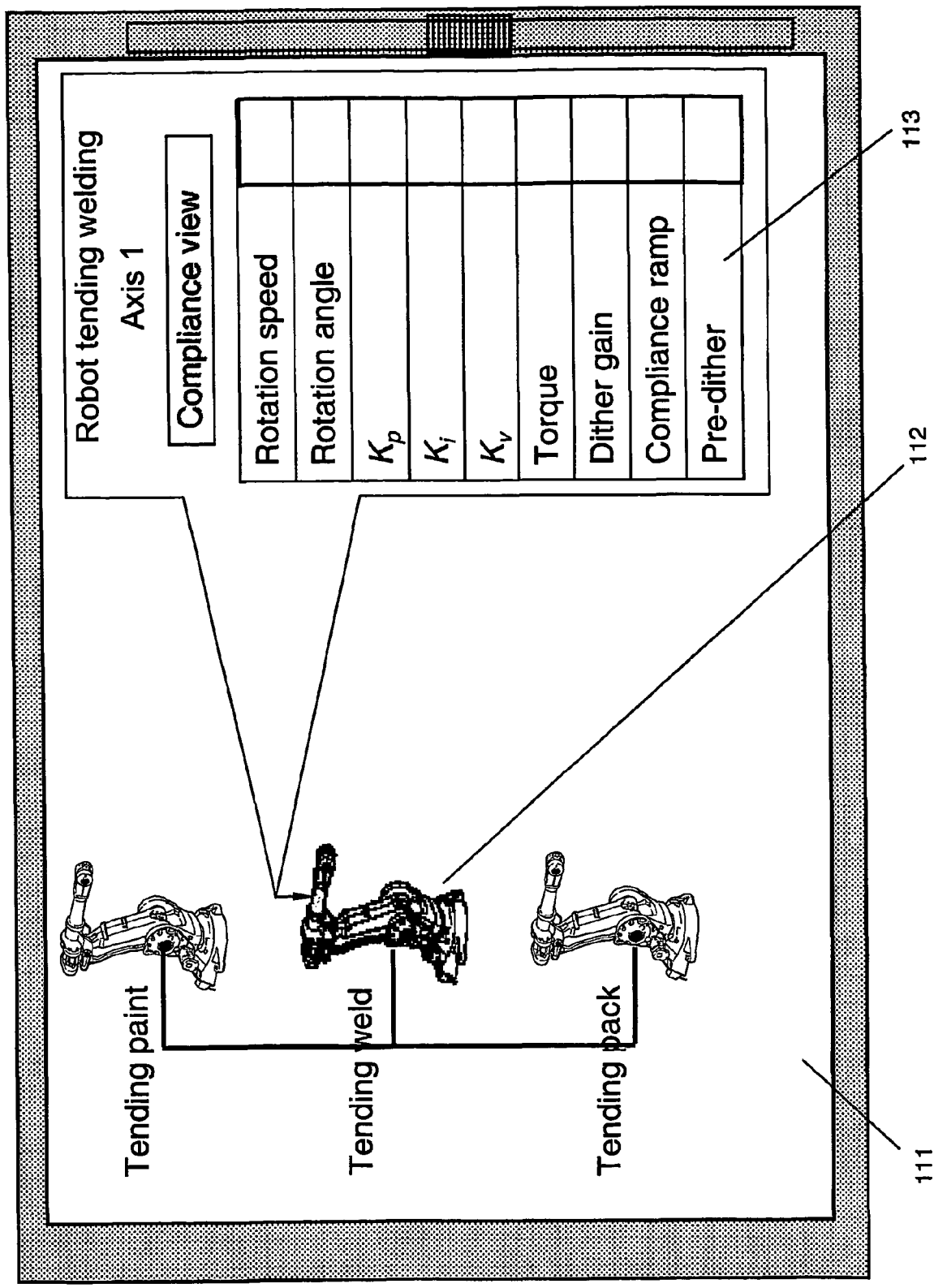
FIG. 11 shows schematically a Graphic User Interface (GUI) for displaying and/or editing an operational state of the robot arm.

FIG. 11 shows a graphical user interface for displaying an operational state of a robot arm mounted on an industrial robot. The GUI 111 comprises a display on a computer display screen or similar display member of a portable computing device and includes a software object 112 representing a robot with at least one robot arm. Upon activation of the robot software object, by an action such as right-clicking with a computer mouse etc. on the object, or a specific axis of the robot software object, a display of operational values 113 for the specific axis or axes selected is shown, in this case for Axis 1 of a robot tending a welding operation. These and other operational values and/or configuration values may be edited or adjusted by using an input means to input or edit such values by means of the GUI 111.

The GUI may be provided on the computer or portable apparatus by a thin client application such as an ordinary web-browser. In addition or instead, a browser that handles JAVA™ applets, or other Java-related applets coded with J2ME (Java 2 Micro Edition™) or similar executable computer programs, which may be either client side and/or server side, may be used. The presentation of the operational data, configuration data and/or diagnostics information based on the data may for example be provided via a XML document or JAVA applet which presents, for example, current and/or stored operational data via the graphical user interface of a portable device. The GUI may also be used to inspect operational values and to edit values when, for example, configuring the robot arm ready to perform an operation or a new task. Thus direct adjustments to carry out compliance control etc. may be input quickly and conveniently by a local user via the GUI who is positioned beside the robot, using for example a Teach Pendant from ABB, or other computerised hand-held device, or else by a user who may be positioned remotely from the robot. In another, further development of the embodiment a portable wireless device, for example a PDA, a Pocket Portal apparatus from ABB, a Teach Pendant from ABB, a PC or a phone may be arranged within wireless range of a wireless receiver/transmitter node of the robot or robot control system with the GUI display means to display and/or edit operational information.

It should be noted that while the above describes exemplifying embodiments of the invention, there are several variations and modifications which may be made to the disclosed solution without departing from the scope of the present invention as defined in the appended claims.

The invention claimed is:

1. An apparatus for controlling an industrial robot, which robot has at least one axis of rotation or translation, the apparatus comprising:
    at least one actuator at said at least one axis for driving a movement of an arm of the robot;
    at least one sensor at each rotatable shaft of said arm;
    a dither-signal generator configured to generate a periodic signal to provide a varying dither signal to a servo of said at least one actuator; and
    a dither control loop configured to automatically adapt the dither amplitude signal;
    wherein the dither control loop is configured to apply a gain ($K_{ad}$) to a dither amplitude control error ($\Delta\tilde{\phi}$) and integrate with an integrator the dither amplitude control error ($\Delta\tilde{\phi}$) before or after applying the gain ($K_{ad}$).

2. The apparatus according to claim 1, wherein the dither control loop is configured to provide an AC output signal and inject the AC output signal into a speed control loop for the robot arm axis.

3. The apparatus according to claim 2, further comprising:
    a dither control structure comprising any of the list of P, PI, PID, PD.

4. The apparatus according to claim 3, wherein the dither control loop is configured to apply changes in the loop gain by means of a ramp function.

5. The apparatus according to claim 1, wherein the dither control loop is further configured to apply a start value to the integrator and use the integrator output signal to control the amplitude of a dither signal generator.

6. The apparatus according to claim 1, further comprising:
    a first switch configured to switch in and out a pre-dither control state; and
    a second switch configured to switch between different levels for the integration control gain ($K_{ad}$) of the dither loop.

7. The apparatus according to claim 6, wherein the second switch comprises means to cause any of: an increase in the integrator gain during a pre-dither time period with normal PI control; a ramp when switching from no dithering with unactivated dither loop to dithering at normal PI control; or a decrease in the integrator gain comprising a ramp following a pre-dither time period when switching from pre-dither to compliance control.

8. The apparatus according to claim 1, further comprising:
    a means for providing a value based on change in gravity torque ($\Delta FG$) of said arm/tool of the robot in a specific axis as a feed forward gravity torque input to the servo.

9. The apparatus according to claim 8, wherein the means for providing a change in gravity torque ($\Delta FG$) includes the function of a low-pass filter.

10. The apparatus according to claim 1, further comprising:
    an algorithm to calculate a value for dither amplitude in the movement of the actuator.

11. The apparatus according to claim 1, wherein the dither control loop comprises a band pass filter for detecting the dithering signal from the measured actuator position.

12. The apparatus according to claim 1, wherein the dither control loop comprises a band pass filter for detecting the dithering signal from measured actuator speed.

13. The apparatus according to claim 1, further comprising:
    a multiplier arranged for multiplying the dithering loop integrator output signal with the dithering signal generator output.

14. The apparatus according to claim 1, further comprising:
    at least one memory unit wherein integrator output values obtained during dithering are stored for at least one axis and for at least one position during an operation cycle for a specific axis.

15. The apparatus according to claim 14, wherein the stored output values for the dithering integrator output are used as an integrator start value at a later time.

16. The apparatus according to claim 15, further comprising:
    a second memory unit and a third memory unit, wherein an input value for the servo without tool/load and, respectively, an input value with tool/load may each be stored.

17. The apparatus according to claim 16, further comprising:
    a first switch wherein a current input value for the servo with tool/load may be transmitted or supplied; and
    a second switch, wherein a difference between input value with tool/load and a value without tool/load may be transmitted or supplied.

18. The apparatus according to claim 1, wherein the actuator comprises a synchronous AC motor controlled by changes in current supplied to the motor.

19. The apparatus according to claim 1, wherein the at least one actuator comprises at least one axis of rotation and/or translation actuator comprised in a manipulator arm.

20. The apparatus according to claim 1, further comprising:
    a graphical user interface for displaying an operational state of the industrial robot with at least one axis of rotation or translation.

21. The apparatus according to claim 20, wherein operational data for a state of the robot arm values are arranged to be displayed upon activation of a part of the graphical representation of the robot arm using any from the list of: computer display selection means, computer mouse, touch screen, stylus, joystick, teach pendant, trackball, keypad or keyboard.

22. The apparatus according to claim 21, wherein control parameters and other information relevant to values of an operational state of the robot arm are arranged editable upon activation of a part of the graphical representation of the robot arm by the input means of the graphic user interface display.

23. A method for controlling an industrial robot, which robot has at least one axis of rotation and/or translation and an apparatus for controlling the robot, the apparatus comprising at least one actuator at said at least one axis for driving a movement of an arm of the robot, at least one sensor at each rotatable shaft of said arm, a dither-signal generator for generation of a periodic signal to provide a varying dither signal to a servo of said at least one actuator, the method comprising:
determining an amplitude of a current dither movement of said actuator;
calculating a deviation from a known reference value of the dither movement;
sending a control error signal representing the dither movement amplitude deviation to an integrating controller; and
providing an integrated reference signal to a multiplier means and by so doing cause the dither amplitude signal to be automatically adapted to a current operating state.

24. The method according to claim 23, further comprising:
providing an AC signal output representing a current torque reference signal dependent on current dither amplitude of said actuator; and
inputting the AC signal output into a speed control loop for the axis of the robot arm.

25. The method according to claim 23, further comprising:
summing the current torque reference signal with a reference signal ($\tilde{\phi}_{ref}$) for expected torque and obtaining a torque reference control error ($\Delta\tilde{\phi}$);
applying a gain ($K_{ad}$) to the change in torque reference ($\Delta\tilde{\phi}$);
supplying a start value to the integrator;
integrating with integrator means the torque reference control error ($\Delta\tilde{\phi}$) together with a torque reference start value; and
supplying the integrated torque reference signal to the multiplier thereby controlling the amplitude of the output of the signal generator.

26. The method according to claim 23, further comprising:
generating a second dither signal prior to the first dither signal, known as a pre-dither signal, for the at least one axis of rotation or translation by means of signal generator; and
compensating for friction related components in the integral component while still under control of any control model from the list of: I, PI, PID.

27. The method according to claim 26, further comprising:
switching to a pre-dither control model; and
applying a gain ($K_i$) to a speed control loop using an integrator means according to a ramp function during a time period under the pre-dither control.

28. The method according to claim 26, further comprising:
switching from normal control via a ramp transition to any of: pre-dither control, compliant control.

29. The method according to claim 28, further comprising:
varying the length of the period of the ramp transition.

30. The method according to claim 29, further comprising:
varying the slope of the transition of the ramp function in order to provide a transfer coefficient that is suitable for transition in relation to a dither signal or a pre-dither signal.

31. The method according to claim 23, further comprising:
switching to normal control from compliant control via a ramp transition.

32. A method according to claim 23, further comprising:
switching to compliant control;
sending any change in gravity torque ($\Delta FG$) while not under I, PI or PID control to a low pass filter;
sending the filtered gravity torque change value ($\Delta FG$) for comparison with a reference model value; and
making a feed forward adjustment for changes in gravity torque.

33. The method according to claim 23, further comprising:
storing learnt values for dither amplitude and/or pre-dither amplitude as integrator output signals corresponding to selected events in an operating cycle in a memory means for use as stored learned values (S1-Sn) in a state memory.

34. The method according to claim 33, further comprising:
retrieving learnt values for dither amplitude (S1-Sn) and/or pre-dither amplitude from the state memory by means of a state selector.

35. The method according to claim 23, further comprising:
storing a servo no-load input value in a first memory unit;
calculating the dither amplitude from the no-load input value;
supplying a current servo input value to a second memory unit;
calculating the difference in input value between the saved no-load input value and saved current load input value; and
supplying the input value difference to the servo, in order to minimise any connecting forces between the robot arm/tool and the surroundings when the current load is released.

36. The method according to claim 35, further comprising:
supplying the current servo input value using a switch.

37. The method according to claim 35, further comprising:
supplying the input value difference to the servo via a low pass filter.

38. The method according to claim 35, further comprising:
setting a control parameter ($K_i$) at an integrator to zero without a ramp to remove any possible residual connecting forces and thereby changing to great compliance and also omitting a pre-dither period.

39. The method according to claim 23, wherein the robot is otherwise manually operated by a human operator in order to teach an operation to the robot.

40. The method according to claim 23, wherein the robot is otherwise manually operated by a human operator in order to configure an operation of the robot.

41. The method according to claim 23, further comprising:
controlling the industrial robot for any operation from the list of: machine tending, manipulating, gripping, welding, painting, machining, packing.

42. A computer readable storage medium containing an executable computer program configured to control an industrial robot, which robot has at least one axis of rotation or translation and an apparatus for controlling the robot, the apparatus comprising at least one actuator at said at least one axis for driving a movement of an arm of the robot, at least one sensor at each rotatable shaft of said arm, a dither-signal generator for generation of a periodic signal to provide a varying dither signal to a servo of said at least one actuator, the computer program performs the steps of:

determining an amplitude of a current dither movement of said actuator;

calculating a deviation from a known reference value of the dither movement;

sending a control error signal representing the dither movement amplitude deviation to an integrating controller; and providing an integrated reference signal to a multiplier and by so doing cause the dither amplitude signal to be automatically adapted to a current operating state.

43. A control system for an industrial robot, which robot comprises at least one axis of rotation or translation and a robot control apparatus, the robot apparatus comprising at least one actuator at each of said axes configured to drive a movement of an arm of the robot, at least one sensor at each of the rotatable shafts configured to measure shaft angle or rotary position, a dither-signal generator configured to generate a periodic signal to provide a varying dither signal to a servo of said at least one actuator, the control system comprising:

a computer program stored on a computer readable storage medium and configured to determine what the amplitude of the current dither movement should be; and a dither control loop configured to automatically adapt the dither amplitude signal;

wherein the dither control loop is configured to apply a gain ($K_{ad}$) to a dither amplitude control error ($\Delta\tilde{\phi}$) and integrate with an integrator the dither amplitude control error ($\Delta\tilde{\phi}$) before or after applying the gain ($K_{ad}$).

44. The control system according to claim 43, further comprising:

at least one database including stored data comprising: a reference amplitude value for a start value for a dither loop integrator function; and data comprising a steady state sum of a dither ramp value and a dither feed-forward signal amplitude each of which are stored and indexed to corresponding present values of robot joint axis angles, wrist load mass parameters, and selected compliance of a compliance control loop.

45. The control system according to claim 43, further comprising:

at least one graphical user interface for displaying an operational state of the industrial robot.

46. The control system according to claim 43, further comprising:

at least one graphical user interface for displaying an operational state of the industrial robot, wherein the graphical user interface is provided to one or more hand-held computing devices or other portable equipment.

47. The control system according to claim 43, further comprising:

at least one graphical user interface for displaying an operational state of the industrial robot, wherein the graphical user interface is provided by one or more wireless-equipped computers or portable equipment comprising the functions of a mobile phone.

* * * * *